United States Patent [19]
Kamppinen

[11] 4,213,289
[45] Jul. 22, 1980

[54] FAN DEVICE FOR ROTARY MOWERS

[76] Inventor: Holger Kamppinen, 428 Williams Ave. North, Renton, Wash. 98055

[21] Appl. No.: 40,975

[22] Filed: May 21, 1979

[51] Int. Cl.³ .............................................. A01D 55/18
[52] U.S. Cl. ...................................... 56/295; 56/13.4
[58] Field of Search ................................. 56/295, 13.4

[56] References Cited

U.S. PATENT DOCUMENTS

| | | | |
|---|---|---|---|
| 2,779,146 | 1/1957 | Mitchell et al. | 56/13.4 |
| 2,807,126 | 9/1957 | Bennett | 56/295 |
| 2,924,059 | 2/1960 | Beeston, Jr. | 56/295 |
| 3,049,855 | 8/1962 | McMillan | 56/295 |
| 3,087,298 | 4/1963 | Phillips, Sr. | 56/295 |
| 3,220,170 | 11/1965 | Smith et al. | 56/295 |
| 3,315,451 | 4/1967 | Hill | 56/295 |
| 3,474,608 | 10/1969 | Frick | 56/295 |

*Primary Examiner*—Paul J. Hirsch
*Attorney, Agent, or Firm*—Ford E. Smith; David L. Garrison

[57] ABSTRACT

A suction and blower fan device of simple construction is disclosed for use with a rotary mower blade mounted upon an upright shaft within a mower housing. The fan device operates to improve the cutting efficiency of the mower blade and functions to produce scouring of the mower housing to a degree, reducing or preventing the objectionable accumulation of clippings on the inner housing surfaces.

5 Claims, 6 Drawing Figures

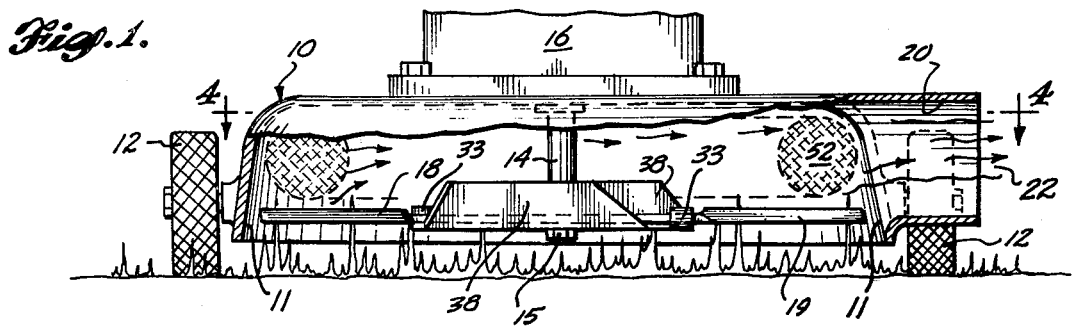
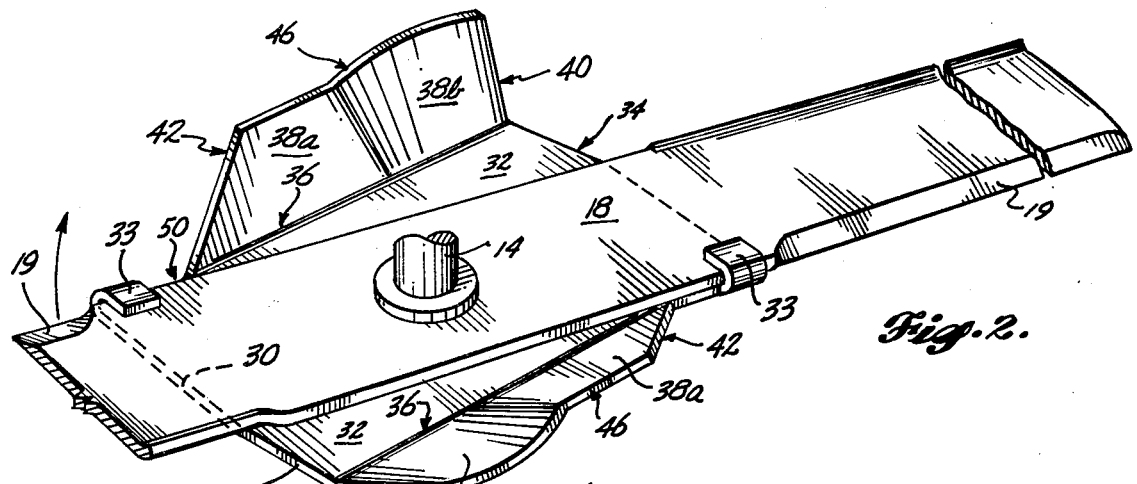
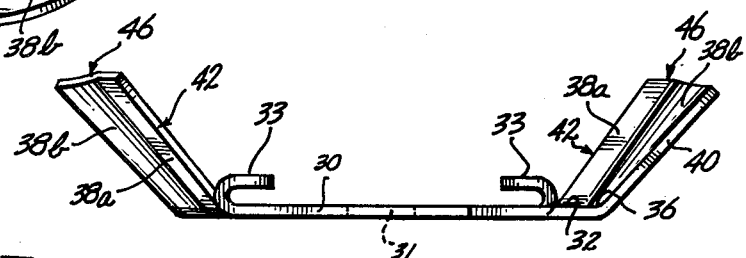
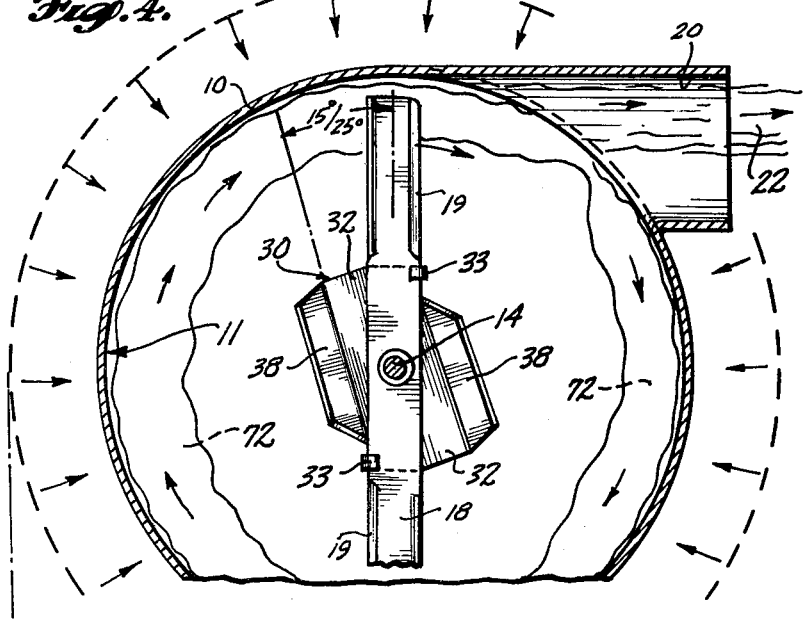
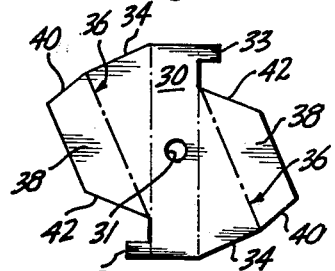
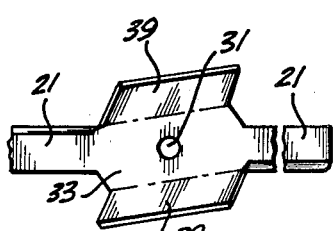

FAN DEVICE FOR ROTARY MOWERS

BACKGROUND OF THE INVENTION

Lawn mowing by the use of rotary mowers is widely known in this country. When a lawn plot is regularly mowed by such a device at fairly frequent intervals under relatively dry conditions, rotary mowers are quite satisfactory. However, when for one reason or another mowing has been delayed too long, the growing grass becomes rank and moist. Efficiency drops in a very material sense, often necessitating mowing a plot at least twice to produce a smooth appearance. Mowing damp or sodden lawns, even at frequent intervals, also is difficult with rotary mowers, largely because the vegetation tends to lie down and become matted. Under such conditions, even though rotary mowing is employed, the cutting is so uneven that when the lawn dries it can have an undesirable shaggy and scruffy appearance.

It is a primary object of this invention to provide a fan device of simple construction, easily assembled with a rotary mower blade which improves and raises the efficiency of the mower to overcome the stated prior problems.

Another condition, the object of which here is to overcome, is inherent with rotary mowers and is particularly noticeable when cutting moist, sodden or lush grass. There is then an accumulation of masses of cuttings within the mower housing, tending to block the housing interior and to reduce if not terminate the outward discharge of cuttings from the housing. It has therefore been another object of this invention to provide a fan device which functions to cause scouring of the inner surfaces of the mower housing and thus defeat the usual and undesirable tendency of the housing to become jammed with cuttings and clippings.

Still another problem seems inherent with rotary mowers. This is particularly noticeable when rotary mowing of overgrown, weedy plots is attempted. It appears that when the vegetation stands higher than the mower housing and a mower is run through it, the vegetation bends over and is pinned horizontally at a level that is below the plane of the rotary cutting blade. Under such conditions little or no clean cutting is possible, except that several passes of the mower are made.

Thus, a further object of this invention has been the provision of a fan device capable of lifting and materially enhancing the mowing of rank, leggy vegetation.

These and other objects and advantages of this invention will become apparent during the course of the following detailed description.

SUMMARY OF THE INVENTION

The fan device here disclosed comprises means providing plate structure disposed laterally outward at the sides of a rotary mower blade at its hub area. The plate structure is adapted to be mounted on the rotary shaft carrying the mower blade. In the preferred form the plate structure provides during rotation oppositely located fan blades each having a leading and a following edge. The following edges are disposed at upright angles to the adjacent leading or cutting edges of the mower blade. Each fan blade is disposed angularly relative the plane of rotation of the plate structure and rises above the plate and the mower blade to which it is attached. The fan blades are disposed at like angles obtuse to the plane of rotation of the mower balde to create upward moving air currents operable to draw upward and erect the grassy material to be mowed. The fan blades also cause the airborne grass and other vegetation to scour the interior of the mower housing to both enhance the mowing efficiency of the mower and also to effect a non-clogging operation of the mower.

A full understanding of this invention will be had from the description in view of the described drawing accompanying this disclosure.

DESCRIPTION OF THE DRAWINGS

FIG. 1 is a partial end view of a conventional rotary lawn mower and its housing with portions broken away to show in side elevation the fan device applied to the mower blade;

FIG. 2 is an enlarged fragmentary perspective view of a rotary mower blade and the fan device showing a variation in the shape of the fan blades;

FIG. 3 is an enlarged end view of the fan device;

FIG. 4 is a sectional view taken in plane 4—4 of FIG. 5 showing the fan device as assembled with a rotary mower blade;

FIG. 5 is a plan view taken of fan device blank as it appears prior to forming; and FIG. 6 is a plan view of an alternate form of rotary cutter in which the fan blades are integral with the cutter bar.

DETAILED DESCRIPTION OF THE INVENTION

In FIGS. 1 and 4 is shown parts of a conventional rotary mower comprising housing 10 supported on wheels 12 whereby it is rolled over the ground. Upright mower shaft 14 within housing 10 is driven by an engine or motor 16 mounted on or above the housing 10. Mower blade 18, having cutting edges 19, is affixed to the lower end of shaft 14 by nut 15. Blade 18 extends outward on opposite sides of shaft 14 with its ends terminating close to the inner surfaces 11 of housing 10. Discharge passage 20 at one side of housing 10 permits airborne vegetation 22 to be expelled laterally of the mower onto the ground or into a receptable or container.

The fan device of this invention is best shown in its preferred form in FIGS. 2 and 3 and in plan in FIG. 5. Plate 30, generally rectangular in plan, is juxtaposed to the underside of blade 18 and is fitted to shaft 14 by means of central hole 31 being secured thereto by nut 15. Slippage of plate 30 under blade 18 is precluded by hooks 33, 33 carried by plate 30 engage over the front or cutting edges of blade 18.

Plate 30 is wider than blade 18 and therefore may be mounted in skewed fashion to provide the triangular laterally-extending plate portions 32, 32 extending outward from the opposite side edges of the mower blade 18. Each plate portion 32 has a leading edge 34 coplanar with the underside of blade 18 and a side edge, demarked in this preferred form, by the folds or bends 36. In FIG. 4 the range of angularity of bends 36 relative to the axis of blade 18 is shown to be between 15° and 25°, the preferred angle being about 20°.

An opposed pair of fan blades 38, 38 rises from the side edges or bends 36 of each plate structure 32 on opposite sides of cutter blade 18. The preferred blades 38 are planar as shown in FIGS. 1, 3 and 4 in which the blade disposition relative the plane of rotation of cutter 18 is at obtuse angles, the angularity range of which is between about 120° and 145° as indicated in FIG. 3. A preferred obtuse angle appears to be 135°. Each fan blade 38 has a leading edge 40 which rises at an angle from the outward extremity of leading edge 34 of the plate structure 32. Trailing or following edge 42 of each fan blade slopes downward as shown in FIG. 2 until it meets or joins the plate structure 32 at the trailing end of bend 36, at point 50 which substantially coincides with the side edge of mower blade 18. The upper edge 46 of each fan blade 38 is disposed approximately parallel to the plane of plate 30, which preferably produced from relatively thin springs sheet metal.

A variation in the contours of the fan blades 38a (see FIG. 2) comprises forming an outwardly swelled concave-convex cupped portion 38b in the forward or leading part of the blade as it rotates. These cupped portions increase the lifting forces of the air and enhance the scrubbing and vegetation discharge functions of the device by materially increasing air flow upward and outward of the cutter.

In FIG. 1 in phantom is indicated the somewhat cyclonic or toroidal shape that a mass 52 of clippings tends to assume when cutter blade 18 and this attachment are being operated together. It is believed that the thus produced cyclonic atmosphere and the toroidal shape of clipping mass is largely responsible for the remarkable, cleanly-scrubbed appearance that is usually to be seen within the mower housing 10.

Numerous observations of the performance of a rotary mower equipped with this fan device have been made. In FIG. 4 a number of in-pointing arrows have been shown to indicate that considerable suction axisward is created under the housing 10. This is demonstrable by operating a mower first without and then with the instant fan device over a sprinkling of clippings on a bare surface. Whereas, without the fan device suction on such clippings barely extends outward from the housing 10, with the fan device, clippings are drawn into the housing from several inches, often up to eight inches, outside the housing. Also, with matted grass the same mower equipped with this fan device smoothly cut a lawn that could only be clipped reasonably smooth after three passes with the mower while unequipped with this fan device. Further, in an early experiment with a prototype fan device of farily light weight brass sheet and with the fan blades 38 disposed vertically relative plate 30, little or no suction appeared to be developed. It was when the blades 38 were disposed obtusely angled to plate 30 and to the plane of rotation that optimum cutting results were obtained.

While the plate structure 30 is here shown as an adjunct to a conventional cutter blade 18 of a rotary lawnmower, it will be clearly obvious to those skilled in the art that the portions 33, 33 and their respective fan blades 39, 39 may be integral with the cutter blade 21 as shown in FIG. 6.

PRIOR ART STATEMENT

The prior art known to this applicant, as shown, is the relevent portions attached thereto, in the following:
U.S. Pat. No. 3,049,855: McMillan, 8/1962
U.S. Pat. No. 2,814,924: Group et al 12, 1957

This prior art is considered not relevant to negate patentability because these prior devices only disclose fan means in which fan blades or wings stand parallel to the axis of rotation and appear to create no air currents moving outward and upward and capable of creating cyclonic action.

In compliance with the statute, the invention has been described in language more or less specific as to structural features. It is to be understood, however, that the invention is not limited to the specific features shown, since the means and construction herein disclosed comprises a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. A fan device for use with a rotary mower blade mounted on an upright mower shaft within a mower housing, comprising:

plate structure extending laterally of said blade at each side of its axis of rotation axisward of the cutting edges of the blade;

each said plate structure providing during rotation a leading edge and a following edge;

said edges being disposed at like but opposite acute angles relative the longitudinal axis of the mower blade;

a fan blade secured axisward of each cutting edge along each side of said plate structure and rising thereabove and above the mower blade at an obtuse angle relative the plane structure; and said fan blades upon rotation above grass-covered earth creating an appreciable lift on the vegetation to cause the same to stand substantially upright in the path of the rotating mower blade and also producing a scouring action on the housing inner surfaces as cut airborne vegetation is moved for outward discharge from the housing.

2. The fan device of claim 1 in which the leading edges of said plate structure are disposed between about 15° and 25° to the longitudinal axis of the mower blade.

3. The fan device of claim 1 in which the fan blades are disposed relative the plane of said plate structure at obtuse angles in the range of 100° to about 125°.

4. The fan device of claim 1 in the plate structure is a separate element from the mower blade mounted against one face thereof for concurrent rotation during mowing.

5. The fan device of claim 1 in which there is an outwardly swelled concave-convex incorporated in the leading portion of each fan blade.

* * * * *